United States Patent
Shimase et al.

(10) Patent No.: US 6,685,259 B1
(45) Date of Patent: Feb. 3, 2004

(54) REINFORCEMENT OF INSTRUMENT PANEL

(75) Inventors: Kiyoshi Shimase, Toyota (JP); Kunji Morimoto, Toyota (JP)

(73) Assignee: Toyota Jidosha Kabushiki Kaisha, Aichi-ken (JP)

( * ) Notice: Subject to any disclaimer, the term of this patent is extended or adjusted under 35 U.S.C. 154(b) by 0 days.

(21) Appl. No.: 10/070,257

(22) PCT Filed: Aug. 30, 2000

(86) PCT No.: PCT/IB00/01239
§ 371 (c)(1),
(2), (4) Date: Mar. 4, 2002

(87) PCT Pub. No.: WO01/17842
PCT Pub. Date: Mar. 15, 2001

(30) Foreign Application Priority Data

Sep. 3, 1999 (JP) ............................................. 11/249914

(51) Int. Cl.$^7$ .............................................. B60K 37/00
(52) U.S. Cl. .......................... 296/203.02; 296/193.02; 296/208; 296/70; 296/192; 296/72
(58) Field of Search ............................ 296/70, 72, 192, 296/203.02, 208, 187, 194, 193.02, 187.01, 187.09; 180/90

(56) References Cited

U.S. PATENT DOCUMENTS

| | | | |
|---|---|---|---|
| 4,432,565 A | | 2/1984 | Suzuki et al. |
| 5,354,114 A | * | 10/1994 | Kelman et al. ............. 296/192 |
| 5,358,300 A | * | 10/1994 | Gray ....................... 296/192 |
| 5,364,159 A | * | 11/1994 | Kelman et al. ............. 296/192 |
| 5,442,518 A | | 8/1995 | Beam |
| 5,678,877 A | * | 10/1997 | Nishijima et al. ............. 296/70 |
| 5,707,100 A | * | 1/1998 | Suyama et al. ............... 296/70 |
| 5,762,395 A | * | 6/1998 | Merrifield et al. .......... 296/208 |
| 5,934,733 A | * | 8/1999 | Manwaring .................. 296/72 |
| 5,934,744 A | * | 8/1999 | Jergens et al. ................ 296/70 |
| 5,979,965 A | * | 11/1999 | Nishijima et al. ............. 296/70 |
| 6,203,092 B1 | * | 3/2001 | Yoshinaka ................... 296/70 |
| 6,273,495 B1 | * | 8/2001 | Haba et al. .................... 296/70 |
| 2002/0130529 A1 | * | 9/2002 | Takano ........................ 296/70 |

FOREIGN PATENT DOCUMENTS

| | | |
|---|---|---|
| DE | 42 04 495 | 8/1993 |
| DE | 94 18 788.6 | 10/1994 |
| DE | 196 46 776 | 5/1998 |
| EP | 0 673 829 | 3/1995 |
| EP | 0 844 137 | 5/1998 |
| FR | 2 724 901 | 9/1994 |
| JP | 11 59220 | 3/1999 |
| JP | 11-115550 | 4/1999 |

* cited by examiner

*Primary Examiner*—Stephen T. Gordon
*Assistant Examiner*—Greg Blankenship
(74) *Attorney, Agent, or Firm*—Finnegan, Henderson, Farabow, Garrett & Dunner, L.L.P.

(57) ABSTRACT

A reinforcement (10) is connected between right and left-side front pillars, and reinforces an instrument panel. A section of the reinforcement (10) has a letter-H type shape. Therefore, a torsional rigidity needed for the reinforcement is secured, and a wire harness (33), a first steering support (14) or the liked can be disposed in a space formed by the letter-H type shape, so that space is effectively used. Furthermore, the reinforcement (10) is formed integrally with a center brace (13), the first and second steering supports (14, 15), a passenger seat-side airbag-securing member (16), a striker (17) of a glove box, and the like, by a die-cast method, so that the number of component parts and the production cost can be reduced.

11 Claims, 5 Drawing Sheets

REINFORCEMENT OF INSTRUMENT PANEL

FIELD OF THE INVENTION

The present invention relates to a reinforcement that connects right and left-side front pillars of a vehicle body in order to reinforce an instrument panel and the vehicle body and, more particularly, to a reinforcement that allows effective use of space.

BACKGROUND OF THE INVENTION

Conventionally, reinforcements that connect right and left-side front pillars and reduce damage to a vehicle body at the time of a side impact have been widely adopted. Such a reinforcement is desired to have a function of retaining a wire harness or other members. Therefore, for example, a reinforcement disclosed in Japanese Patent Application Laid-Open No. HEI 11-115550 has a rectangular closed-section portion for securing a strength and an open-section portion for retaining a wire harness.

However, since the aforementioned reinforcement is provided with the closed-section portion and the open-section portion, the reinforcement has a problem of an increased size (increased diameter) as a whole.

DISCLOSURE OF THE INVENTION

The invention has been accomplished to cope with the aforementioned problem. A characteristic thereof is that in a reinforcement of an instrument panel that connects left and right-side front pillars of a vehicle body, a section of at least a portion of the reinforcement has a generally letter-H type shape (generally letter-H shape). Therefore, the reinforcement has opening portions, so that members and component parts, such as a vehicle functional component part-mounting member, a functional component part, a wire harness and the like, can be disposed and laid in the opening portions. Hence, the space occupied by the reinforcement (the external shape thereof) can be effectively used. Furthermore, since the section of the reinforcement is a generally letter-H shape, the reinforcement secures a necessary torsional rigidity while having a reduced sheet thickness.

In this case, if the reinforcement is formed integrally with at least one of a mounting member for mounting a vehicle functional component part, such as a steering column (assembly), a passenger seat airbag (assembly) and the like, a vehicle functional component part, such as a striker of a glove box and the like, and a center brace, a reduction of the number of component parts can be accomplished. At the same time, since there is no need to separately secure such component parts by welding or the like, the production cost can be reduced. Furthermore, if a vehicular wire harness is laid within an outer contour of the reinforcement defined by a section of the reinforcement, the space occupied by the reinforcement is effectively used, and a path of the wire harness is determined, thus achieving an advantage of stably securing the wire harness.

DETAILED DESCRIPTION OF THE PREFERRED EMBODIMENTS

Figure 1:
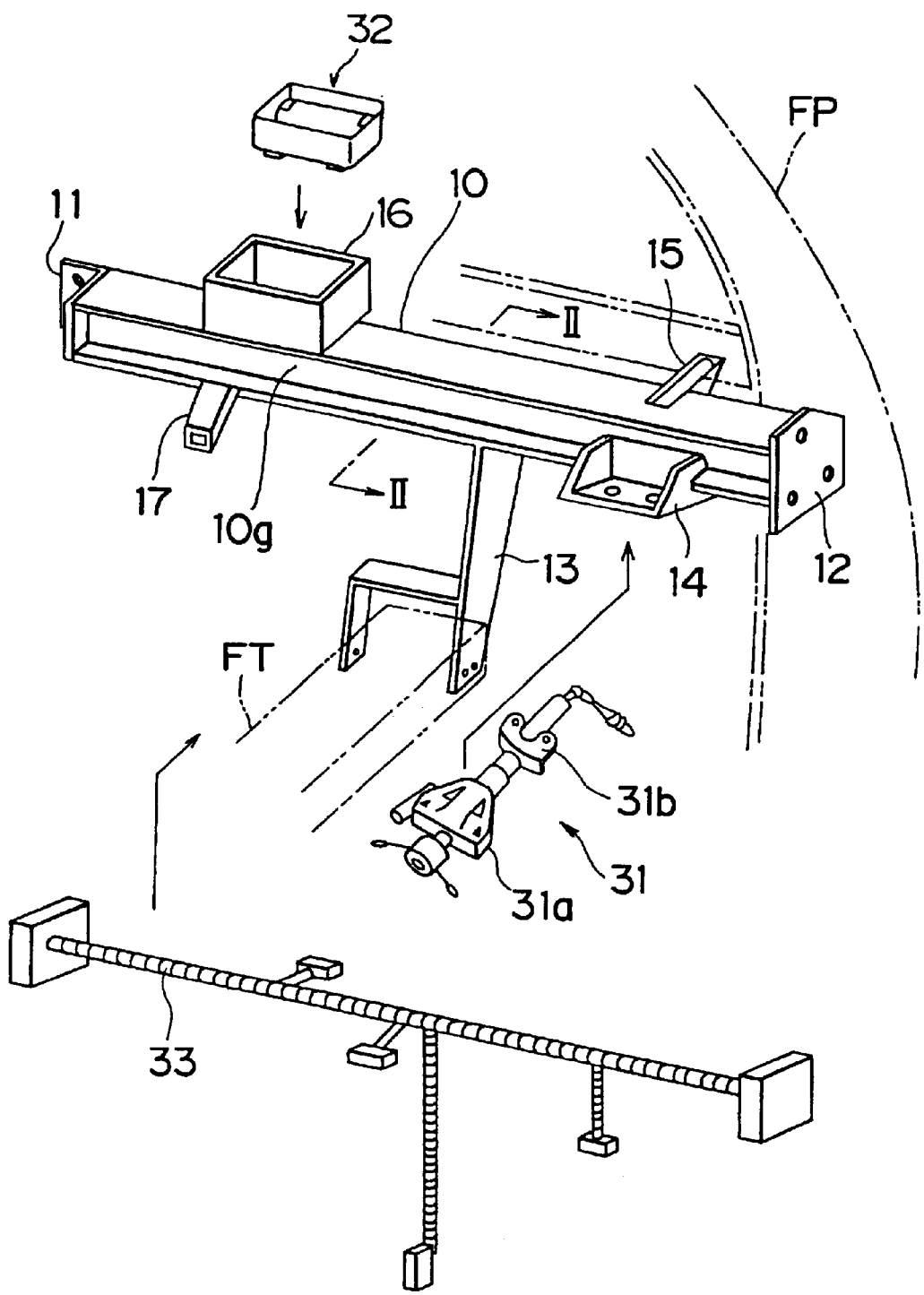
FIG. 1 is a perspective view of a first embodiment of the reinforcement of the invention.

A first embodiment of the invention will be described with reference to FIG. 1 and FIG. 2. A reinforcement 10 of an instrument panel shown in FIG. 1 is a reinforcement member for reducing a damage (fall of a front pillar) that a vehicle body receives at the time of a side impact on a vehicle or the like. The reinforcement 10 has connecting portions 11, 12 in its two end portions in a direction of a length (a right-left direction with respect to the vehicle body), each of the connecting portions having a plurality of bolt holes. The connecting portion 11 and the connecting portion 12 are connected and secured to a left-side front pillar via a bracket that is not shown in the drawings and to a right-side pillar FP indicated by a virtual line, respectively, by means of bolts. Alternatively, the reinforcement may be secured to the front pillars by other means, for example welding, caulking, riveting or the like. The reinforcement 10 thus connects the right and left-side pillars.

Figure 2:
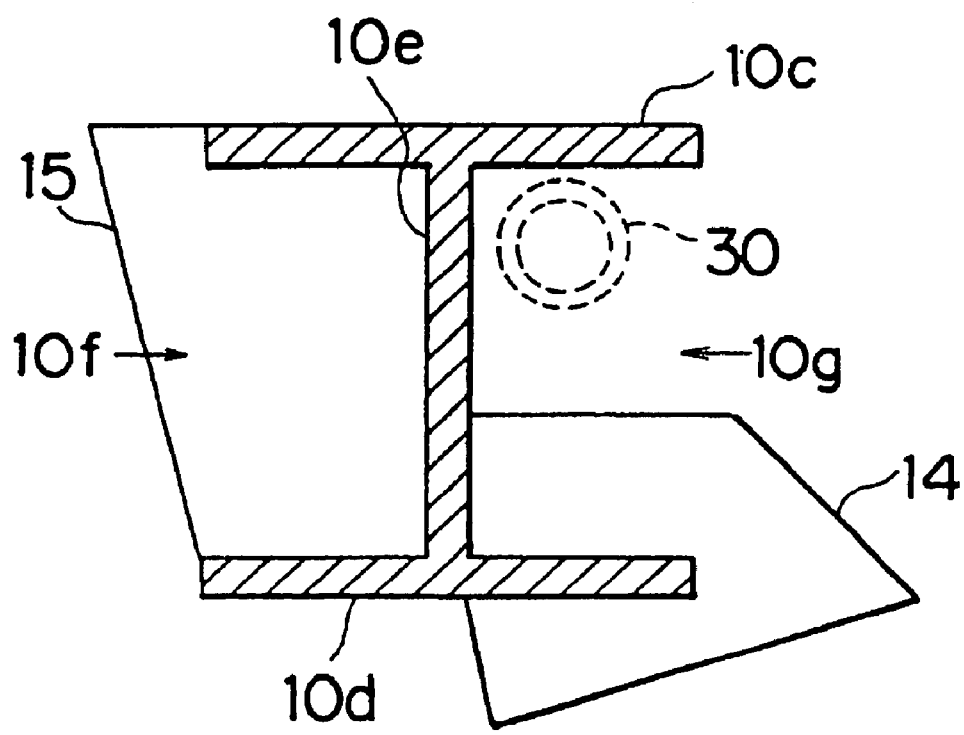
FIG. 2 is a II—II sectional view of the reinforcement shown in FIG. 1.

A section of the reinforcement 10 perpendicular to the direction of the length of the reinforcement 10 (a section taken on II—II in FIG. 1) has a generally letter-H type shape as shown in FIG. 2. That is, the reinforcement 10 has a configuration formed by disposing two generally identically-shaped thin sheets 10c, 10d (hereinafter, the thin sheet 10c will be referred to as "upper thin sheet 10c", and the thin sheet 10d as "lower thin sheet 10d", for convenience in description) substantially parallel to each other so as to face each other, and connecting the thin sheets at their center axes extending in a direction of the length of the sheets by a thin sheet 10e. In a state where the reinforcement 10 is secured to the right and left-side front pillars, the reinforcement 10 defines a pair of opening portions 10f, 10g that are open forward and rearward with respect to the vehicle, respectively.

A center brace 13 extending downward from the lower thin sheet 10d is formed integrally with the lower thin sheet 10d in a substantially central portion of the reinforcement 10 in the direction of the length thereof. A lower end of the center brace 13 is formed so as to be bolted to a side surface of a floor tunnel portion FT formed in a front floor.

With regard to the reinforcement 10, first and second steering supports 14, 15, an airbag assembly securing member 16 and the like that are mounting members for securing vehicle functional component parts, such as a steering column assembly 31, a passenger seat airbag assembly 32, and the like, are formed integrally with the reinforcement 10.

Specifically, as shown also in FIG. 2, the first steering support 14, which directly (or indirectly via another member) supports, on its lower surface side, a breakaway bracket 31a of the steering column assembly 31, is formed so that the first steering support 14 sandwiches the lower thin sheet 10d and so that an upper end of the first steering support 14 is positioned at a substantially central portion of the connecting thin sheet 10e so as not to close the opening portion 10g. Furthermore, the second steering support 15, which supports, on its lower surface side, a lower bracket 31b of the steering column assembly 31 indirectly via another member, extends from all of the upper thin sheet 10c, the lower thin sheet 10d and the connecting thin sheet 10e forward with respect to the vehicle.

The mounting member 16 for the passenger seat airbag assembly 32 is a member for housing and securing the passenger seat airbag assembly 32. The mounting member 16 has a generally rectangular parallelepiped shape whose upper side is open. The mounting member 16 is formed on an upper surface of the upper thin sheet 10c, at a position corresponding to a position of a passenger seat. A striker 17 of a glove box (a member having, at its distal end, a squared letter-U shaped member that engages with a hook of the glove box not shown in the drawing), that is, a vehicle functional component part, extends from a suitable portion of the lower thin sheet 10d corresponding to the passenger seat position, rearward and downward with respect to the vehicle.

A wire harness 33 for the vehicle is laid in the instrument panel, and is connected to, for example, meters, an air-conditioner appliance and the like, or a center cluster panel (switches and the like, displays, etc.). In this embodiment, the wire harness 33 is secured and laid in the direction of the length of the reinforcement 10, within the opening portion log of the reinforcement 10 (within the sectional shape of the reinforcement 10, that is, within an outer contour defined by the section). Alternatively, the second steering support 15 may be provided with a hole or a cutout (not shown) penetrating the main plane of the second steering support 15, so that a wire harness or an air duct or the like may be arranged in the second opening portion 10f.

The above-described reinforcement 10 (including the end portions 11, 12) is made of aluminum, magnesium alloy, or the like. The reinforcement 10 is formed integrally with the center brace 13, the first and second steering supports 14, 15, the mounting member 16, and the striker 17 of the glove box, by a die-cast method.

In the above-described first embodiment, the reinforcement 10 is connected between the right and left-side front pillars, thereby reinforcing a vehicle body construction. Furthermore, since the sectional shape of the reinforcement 10 is of a letter-H type, a torsional rigidity can be secured without a need to considerably increase the sheet thickness of the reinforcement 10. Thus, vibrations and noises produced in the vehicle body are reduced and, at the same time, the riding comfort also improves.

Furthermore, since the sectional shape of the reinforcement 10 is set to the letter-H type shape, a space (roomage) occupied by the reinforcement 10 can be effectively used. That is, in the foregoing embodiment, because the first and second steering supports 14, 15 are partially or entirely placed within the opening portions 10f, 10g defined by the upper thin sheet 10c, the lower thin sheet 10d and the connecting thin sheet 10e, the roomage of the opening portion 10g, that is, the space occupied by the external shape of the reinforcement 10, is effectively used.

Similarly, the wire harness 33 can be laid within the outer contour defined by a section of the reinforcement 10. This also makes effective use of the space occupied by the reinforcement 10. In addition, since the wire harness 33 extends and is secured within the reinforcement 10, the path of the wire harness 33 becomes linear, so that occurrence of an unnecessary bending stress in the wire harness 33 is avoided and so that interference between the wire harness 33 and other component parts present within the instrument panel can be avoided.

Furthermore, in the first embodiment, the mounting members for securing vehicle functional component parts, such as steering column assembly 31, the passenger seat airbag assembly 32 and the like, vehicle functional component parts, such as the striker 17 of the glove box and the like, and the center brace 13 are formed integrally with the reinforcement by a die-cast method. Therefore, the number of component parts is reduced. Moreover, since these component parts do not need to be separately secured to the reinforcement by welding or the like, the production cost as a whole can be reduced.

Figure 3:
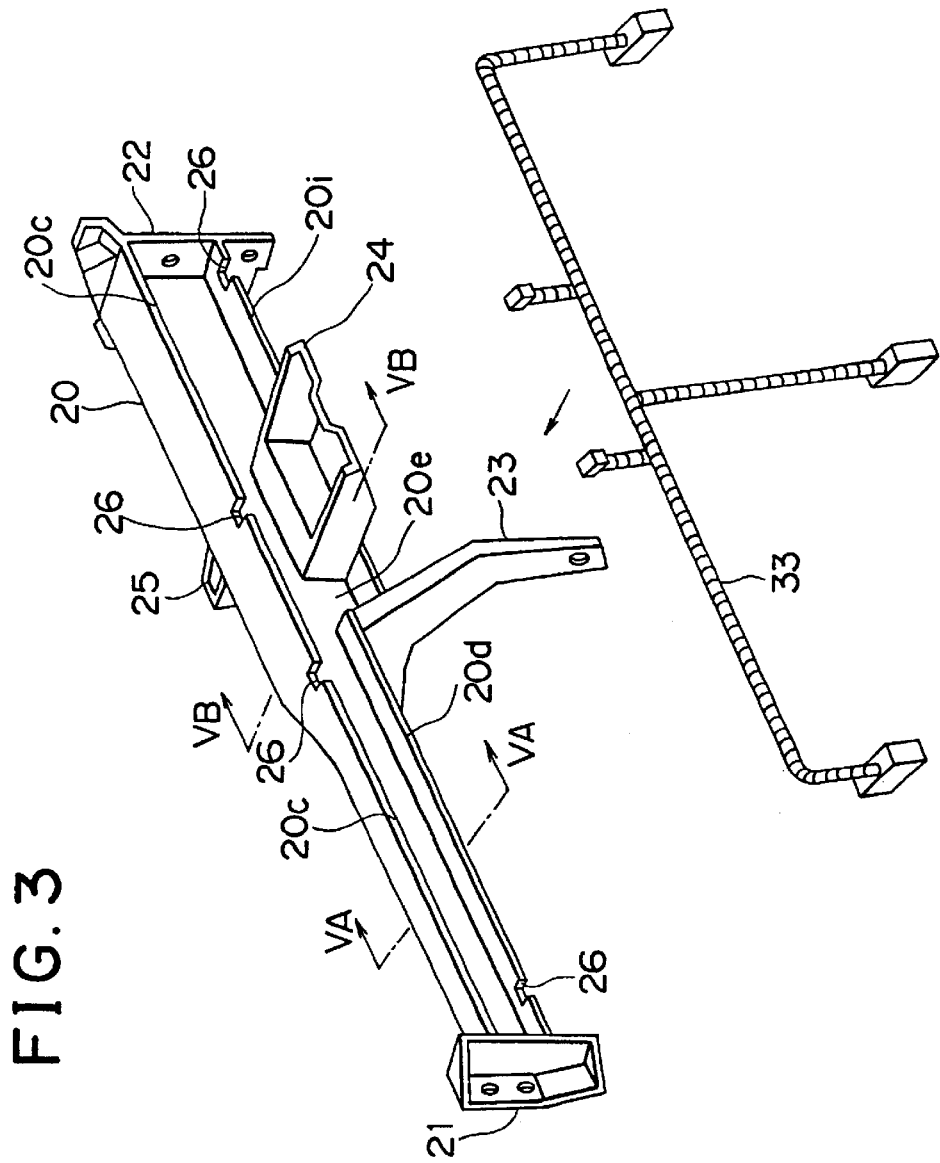
FIG. 3 is a perspective view of a second embodiment of the reinforcement of the invention.
Figure 4:
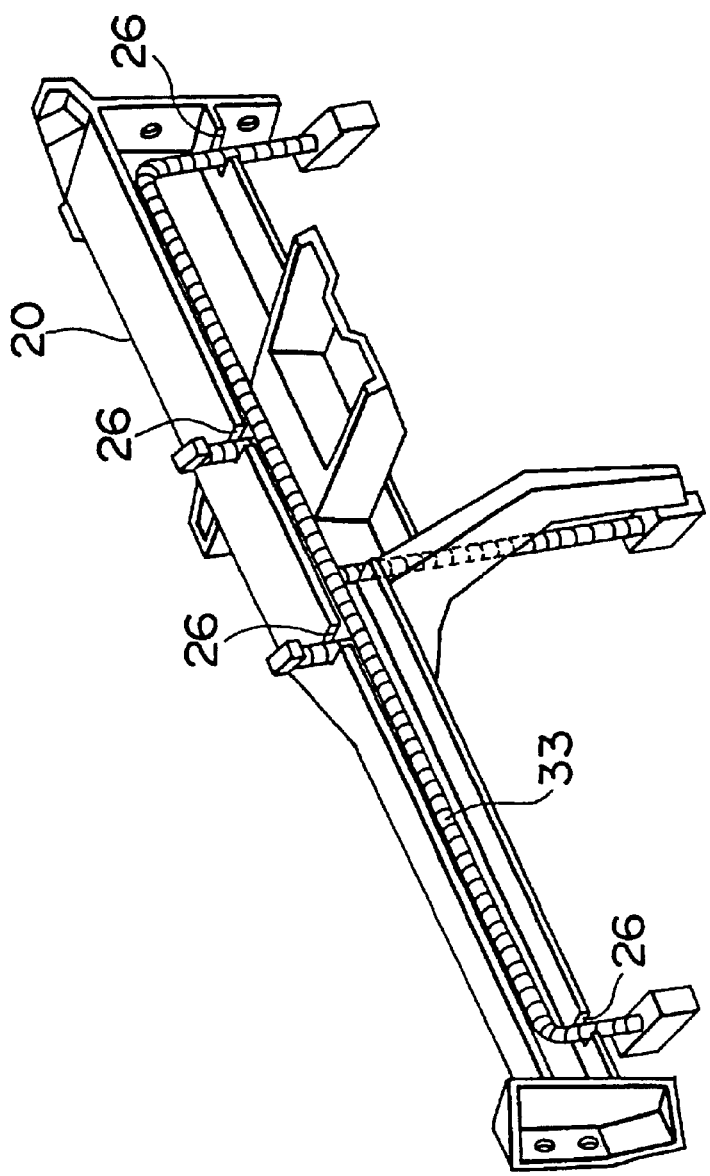
FIG. 4 is a perspective view of the reinforcement shown in FIG. 3, wherein a wire harness is laid.

Next, a second embodiment of the invention will be described with reference to FIG. 3 to FIG. 5. A reinforcement 20 of an instrument panel of the second embodiment has a configuration that is slightly different from the configuration of the reinforcement 10. That is, the reinforcement 20 has connecting portions 21, 22 in its two end portions in a direction of a length thereof, each of the connecting portions having a plurality of bolt holes. The connecting portion 21 and the connecting portion 22 are secured to a left-side front pillar and a right-side front pillar, respectively, by bolts, so that the reinforcement 20 connects the right and left-side front pillars, as in the reinforcement 10. Alternative securing methods and means can be used as described for the first embodiment.

Figure 5A:
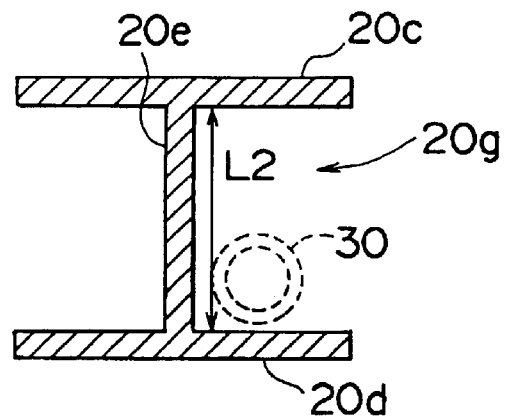
FIG. 5A is a VA—VA sectional view of the reinforcement shown in FIG. 3.
Figure 5B:
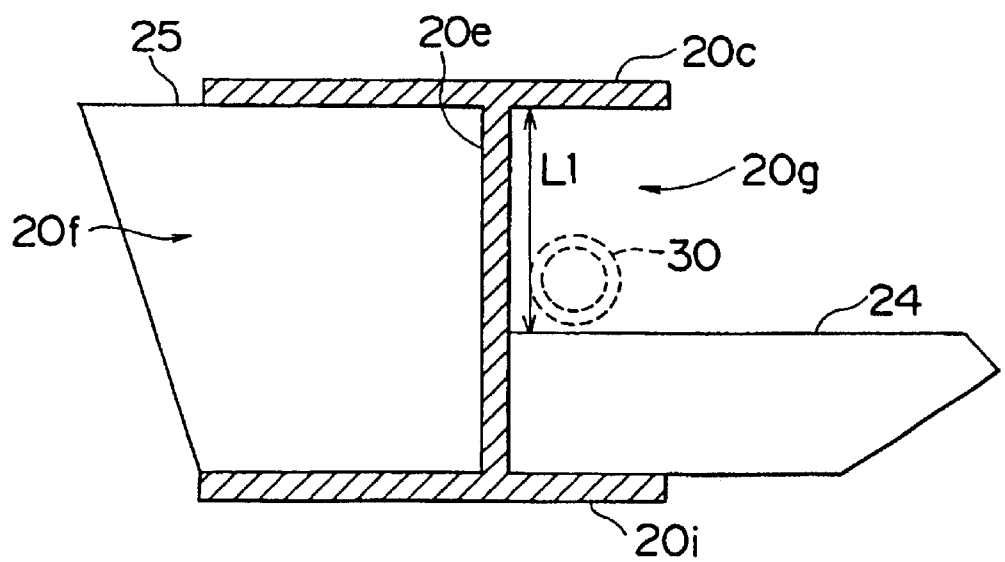
FIG. 5B is a VB—VB sectional view of the reinforcement shown in FIG. 3.

However, although the shape of a section of the reinforcement 20 perpendicular to the direction of the length thereof at any site is a generally letter-H type shape, the sectional shape of a first portion of the reinforcement 20 between the connecting portion 21 and a center brace 23 is slightly different from the sectional shape of a second portion between the center brace 23 and the connecting portion 22. That is, the section of the first portion (a section taken on VA—VA in FIG. 3) has a letter-H type shape that is the same shape as in the reinforcement 10, as shown in FIG. 5A. In contrast, the section of the second portion (a section taken on VB—VB in FIG. 3) has a generally letter-H type shape, as shown in FIG. 5B, in which upper and lower thin sheets 20c, 20i extend further leftward in the drawing (forward with respect to a vehicle) than those in the first portion, and a connecting thin sheet 20e extends further downward in the drawing (downward with respect to the vehicle) than that in the first portion, and thus the width and the height are increased in comparison with the first portion.

As in the reinforcement 10, the reinforcement 20 is formed integrally with the center brace 23, first and second steering supports 24, 25, etc. However, as indicated also in FIG. 5B,the first steering support 24 is formed on a upper position in the lower thin sheet 20d, and is formed so that a distance L1 between an upper end surface of the steering support 24 and a lower surface of the upper thin sheet 20c substantially equals a distance L2 between an upper surface of the lower thin sheet 20d and the lower surface of the upper thin sheet 20c in the first portion.

Furthermore, a plurality of generally rectangular cutouts 26 (that are open rearward with respect to the vehicle) are formed in the upper thin sheet 20c and the lower thin sheet 20d of the reinforcement 20. As shown in FIG. 4, the cutouts 26 are portions through which a main line and branch lines of a wire harness 33 are passed when the wire harness 33 is laid in an opening portion 20g of the reinforcement 20. The cutouts 26 function to allow the main line and the branch lines to be oriented in adequate directions. Similar cutouts can be provided as with the first embodiment.

The above-described reinforcement 20 (including the end portions 21, 22) is made of aluminum, magnesium alloy, or the like, as in the reinforcement 10. The reinforcement 20 is formed integrally with the center brace 23, the first and second steering supports 24, 25, and the like, by a die-cast method.

The second embodiment achieves the advantages of the first embodiment. Furthermore, in comparison with the rigidity of the first portion of the reinforcement 20 mainly intended to reinforce a vehicle body construction, the rigidity of the second portion intended also to reduce steering vibrations is increased. Therefore, a more efficient weight distribution can be achieved, and a weight reduction as a whole is possible. Furthermore, the first steering support 24 in the second portion is formed so as not to close the opening portion 20g, so that a layout path of the wire harness is secured. Moreover, since the upper end surface of the first steering support 24 and the upper surface of the lower thin sheet 20d in the first portion are at substantially equal heights, the wire harness 33 can be linearly laid substantially throughout the length of the reinforcement 20, thereby achieving an advantage of not giving an unnecessary stress to the wire harness 33 and an advantage of shortening the wire harness 33. As described in the first embodiment, the second steering support 25 may also be provided with a hole or cutout penetrating the main plane thereof, thus not closing the second opening portion 20f.

As described above, in each of the first and second embodiments of the invention, the sectional shape of the reinforcement is a generally letter-H type shape, and therefore, the reinforcement has a construction wherein other component parts or the like can be disposed within the outer contour defined by a section of the reinforcement (within a section), so that the space can be effectively used, and wherein a necessary torsional rigidity can be secure without a need to considerably increase the sheet thickness.

Although in the foregoing embodiments, the reinforcements 10, 20 are formed by a die-cast method, the reinforcement may also be formed so as to have a letter-H-shaped section by an extrusion forming method, a technique in which a group of squared-letter-U-shaped iron members are bonded together, etc. Furthermore, although in the embodiments, the reinforcements 10, 20 are secured to the front pillars so that the opening portions 10f, 10g, 20f, 20g of the reinforcements 10, 20 face forward and rearward with respect to the vehicle, this construction is not restrictive, but the reinforcement may also be secured so that the opening portions face upward and downward or in diagonal directions with respect to the vehicle. Still further, although in the embodiments, the wire harness is laid within the section of the reinforcement, an air-conditioner duct may be provided within the section, instead of the wire harness or together with the wire harness.

Still further, although in the first and second embodiments, each reinforcement 10, 20 is mounted to the vehicle body before the wire harness 33 and the like are mounted, the invention is not limited by the embodiments. The invention is also applicable to a case where the wire harness 33, an airbag, a steering column, an instrument panel and the like are mounted to the reinforcement 10, 20 to form an assembly (instrument panel module) and the assembly is mounted to a vehicle body.

A reinforcement 10 is connected between right and left-side front pillars, and reinforces an instrument panel. A section of the reinforcement 10 has a letter-H type shape. Therefore, a torsional rigidity needed for the reinforcement is secured, and a wire harness 33, a first steering support 14 or the like can be disposed in a space formed by the letter-H type shape, so that Space is effectively used. Furthermore, the reinforcement 10 is formed integrally with a center brace 13, the first and second steering supports 14, 15, a passenger seat-side airbag-securing member 16, a striker 17 of a glove box, and the like, by a die-cast method, so that the number of component parts and the production cost can be reduced.

It is noted that the invention is not limited to the above embodiments and modifications, but is only limited by the scope of the appended claims.

What is claimed is:

1. An instrument panel reinforcement, connecting left and right side front pillars of a vehicle body, comprising:

an elongated H-shaped portion, having left and right end portions; and connecting portions provided at the left and right end portions attaching the left and right end portions to the left and right side front pillars, respectively wherein the die cast material is one of aluminum and magnesium alloy.

2. The instrument panel reinforcement of claim 1, wherein the elongated generally H-shaped portion defines a contour portion holding a wire harness for the vehicle.

3. The instrument panel reinforcement of claim 1, wherein the elongated generally H-shaped portion comprises a die-cast material.

4. The instrument panel reinforcement of claim 1, wherein the elongated generally H-shaped portion comprises a first portion and a second portion.

5. The instrument panel reinforcement of claim 4, wherein the first portion differs from the second portion in width.

6. The instrument panel reinforcement of claim 4, wherein the first portion differs from the second portion in height.

7. The instrument panel reinforcement of claim 4, wherein the first portion differs from the second portion in rigidity.

8. The instrument panel reinforcement of claim 1, further comprising at least one of a vehicle functional component mounting member, a vehicle functional component portion, and a brace portion, formed integrally with the elongated generally H-shaped portion.

9. The instrument panel reinforcement of claim 8, wherein when the vehicle functional component mounting member is formed integrally with the elongated generally H-shaped portion, said vehicle functional component mounting member comprises an airbag securing member.

10. The instrument panel reinforcement of claim 8, wherein when the vehicle functional component portion is formed integrally with the elongated generally H-shaped portion, said vehicle functional component member portion comprises one of a steering column assembly and an airbag assembly.

11. The instrument panel reinforcement of claim 8, wherein when the brace portion is formed integrally with the elongated generally H-shaped portion, said brace portion comprises a center brace extending to a floor of the vehicle.

* * * * *

UNITED STATES PATENT AND TRADEMARK OFFICE
CERTIFICATE OF CORRECTION

PATENT NO. : 6,685,259 B1
DATED : February 3, 2004
INVENTOR(S) : Kiyoshi Shimase et al.

It is certified that error appears in the above-identified patent and that said Letters Patent is hereby corrected as shown below:

<u>Title page,</u>
Item [57], ABSTRACT,
Line 6, "liked" should read -- like --.

<u>Column 6,</u>
Line 52, "component member portion" should read -- component portion --.

Signed and Sealed this

Thirteenth Day of April, 2004

JON W. DUDAS
*Acting Director of the United States Patent and Trademark Office*